United States Patent
Kim et al.

(10) Patent No.: US 11,293,646 B2
(45) Date of Patent: Apr. 5, 2022

(54) WATER STORAGE TANK AND GAS WATER HEATER

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Kiweon Kim, Wuhu (CN); Guorong Liang, Wuhu (CN); Sheng Liu, Wuhu (CN); Zuan Lu, Wuhu (CN); Guanxian Huang, Wuhu (CN); Xiaowen Du, Wuhu (CN); Meiling He, Wuhu (CN)

( * ) Notice: Subject to any disclaimer, the term of this patent is extended or adjusted under 35 U.S.C. 154(b) by 0 days.

(21) Appl. No.: 16/967,731

(22) PCT Filed: Nov. 14, 2018

(86) PCT No.: PCT/CN2018/115298
§ 371 (c)(1),
(2) Date: Aug. 6, 2020

(87) PCT Pub. No.: WO2019/153819
PCT Pub. Date: Aug. 15, 2019

(65) Prior Publication Data
US 2021/0041113 A1    Feb. 11, 2021

(30) Foreign Application Priority Data
Feb. 9, 2018 (CN) .......................... 201820240521.8

(51) Int. Cl.
*F24D 3/08* (2006.01)
*F24D 17/00* (2022.01)
(Continued)

(52) U.S. Cl.
CPC .......... *F24D 17/0031* (2013.01); *F16L 59/10* (2013.01); *F24H 1/0027* (2013.01);
(Continued)

(58) Field of Classification Search
CPC .. F28F 2009/222; F28D 9/0006; F24D 3/082; F24H 1/125; F24H 9/124; F24H 7/00; F24H 8/00
See application file for complete search history.

(56) References Cited

U.S. PATENT DOCUMENTS 4,106,692 A * 8/1978 Baier .................. F24D 3/08
126/400
4,735,174 A * 4/1988 Crump ................ F24H 1/205
122/14.3

(Continued)

FOREIGN PATENT DOCUMENTS

CN    205002351 U    1/2016
CN    106091385 A    11/2016
(Continued)

OTHER PUBLICATIONS

International Search Report of PCT/CN2018/115298.

*Primary Examiner* — Gregory A Wilson
(74) *Attorney, Agent, or Firm* — Kilpatrick Townsend & Stockton, LLP

(57) ABSTRACT

The present disclosure provides a water storage tank and a gas water heater. The water storage tank includes: a tank body provided with an interface at one end; an adapter provided with a water inlet connector, a water outlet connector, and a waste discharge connector; and a connection pipe installed in the tank body, one end of the connection pipe communicating with the water outlet connector, another end of the connection pipe being spaced apart from an end of the tank body away from the interface.

17 Claims, 5 Drawing Sheets

(51) Int. Cl.
*F16L 59/10* (2006.01)
*F24H 1/00* (2022.01)
*F24H 9/00* (2022.01)
*F24H 9/02* (2006.01)

(52) U.S. Cl.
CPC ............ *F24H 9/0015* (2013.01); *F24H 9/02* (2013.01); *F24D 2240/10* (2013.01)

(56) References Cited

U.S. PATENT DOCUMENTS

| | | | | |
|---|---|---|---|---|
| RE33,082 E | * | 10/1989 | Gerstmann | F24D 11/005 122/20 B |
| 4,907,570 A | * | 3/1990 | Lemense | F24H 1/182 122/19.1 |
| 5,609,265 A | * | 3/1997 | Haberkorn | B65D 81/3886 220/694 |
| 5,677,026 A | * | 10/1997 | Santoli | F24H 1/182 428/76 |
| 6,532,907 B1 | * | 3/2003 | Harrison | B65D 90/24 122/494 |
| 6,718,925 B2 | * | 4/2004 | Toyoshima | F28D 20/0034 123/142.5 R |
| 7,493,877 B2 | * | 2/2009 | Broadway | F24H 9/02 122/19.2 |
| 7,763,215 B2 | * | 7/2010 | Sakai | F28F 9/0219 422/187 |
| 8,307,696 B2 | * | 11/2012 | Filippi | B01J 8/0214 73/40.5 R |
| 8,684,070 B2 | * | 4/2014 | Wessel | F28F 13/06 165/145 |
| 9,249,986 B2 | * | 2/2016 | Hazzard | F24H 9/06 |
| 2004/0188533 A1 | * | 9/2004 | Ito | F01P 11/20 237/44 |
| 2006/0131314 A1 | * | 6/2006 | Lombari | F24D 3/1008 220/721 |
| 2006/0231640 A1 | * | 10/2006 | Hashimura | B60H 1/04 237/34 |
| 2011/0024458 A1 | * | 2/2011 | Tanaka | B67D 3/0038 222/146.6 |
| 2019/0145631 A1 | * | 5/2019 | Wideman | F28D 20/0034 122/13.01 |
| 2020/0141612 A1 | * | 5/2020 | Thibodeaux, Jr. | F24H 9/2035 |

FOREIGN PATENT DOCUMENTS

| | | |
|---|---|---|
| CN | 206191918 U | 5/2017 |
| CN | 206905307 U | 1/2018 |
| CN | 207881221 U | 9/2018 |
| JP | 2007010123 A | 1/2007 |

* cited by examiner

WATER STORAGE TANK AND GAS WATER HEATER

CROSS-REFERENCES TO RELATED APPLICATIONS

The present disclosure is a national phase application of International Application No. PCT/CN2018/115298, filed on Nov. 14, 2018, which claims priority to Chinese Application No. 201820240521.8, filed in the Chinese Patent Office on Feb. 9, 2018, the entireties of which are herein incorporated by reference.

FIELD

The present disclosure relates to the field of water heaters, in particular to a water storage tank and a gas water heater.

BACKGROUND

In order to solve the instability of the temperature of the discharged hot water during the use of the existing gas water heater, a water storage tank is generally installed on the water outlet pipe of the gas water heater. The water storage tank has a volume, which can mix the hot water evenly when the hot water enters the inside of the water storage tank, thus ensuring that the temperature of the hot water discharged from the water storage tank is stable.

The existing water storage tank has two water inlet and outlet ways. One is water inlet at the upper end and water outlet at the lower end; the other is water inlet and outlet both at the lower end. However, the existing water inlet and outlet ways of the water storage tank determine that the water entering the water storage tank can naturally flow out from the water outlet of the water storage tank under its own gravity, and the water storage tank does not have the function of storing hot water.

SUMMARY

The main objective of the present disclosure is to provide a water storage tank, which aims to improve the water storage capacity of the water storage tank.

In order to achieve the above objective, the present disclosure provides a water storage tank, applied to a water heater, the water storage tank including:

a tank body provided with an interface at one end;

an adapter fixedly connected to the tank body, the adapter being provided with a water inlet connector, a water outlet connector, and a waste discharge connector communicating with the interface; and a connection pipe installed in the tank body, one end of the connection pipe communicating with the water outlet connector, another end of the connection pipe being spaced apart from an end of the tank body away from the interface.

In an embodiment, the water storage tank further includes a guide plate sleeved on the connection pipe and adjacent to the interface, the guide plate being provided with guide holes.

In an embodiment, a density of the guide holes on the guide plate gradually increases from an inner side of the guide plate to an outer side of the guide plate.

In an embodiment, a diameter of the guide holes on the guide plate gradually increases from an inner side of the guide plate to an outer side of the guide plate.

In an embodiment, the water storage tank further includes a thermal insulation member made of thermal insulation material, the thermal insulation member being configured to cover the tank body.

In an embodiment, the water storage tank further includes a flame-retardant fastening bag, the flame-retardant fastening bag being sleeved on the thermal insulation member.

In an embodiment, the water storage tank further includes a temperature sensor, the temperature sensor being installed on the end of the tank body away from the interface; and a length of a temperature sensing probe of the temperature sensor extending into the tank body is greater than or equal to a gap between an end of the connection pipe away from the adapter and an end of the tank body away from the adapter.

In an embodiment, the end of the tank body away from the adapter is penetrated with an installation hole; the temperature sensor is installed on an outer surface of the tank body; and the temperature sensing probe of the temperature sensor is configured to extend into the tank body from the installation hole.

In an embodiment, the adapter includes a main body, a first connector, and a second connector in a cylindrical shape;

the main body includes a first section with a larger inner diameter and communicating with the interface of the tank body, and a second section with a smaller inner diameter and communicating with the first section, the second section being configured to form the water outlet connector;

the first connector is in communication with the first section, and configured to form the water inlet connector together with the first section; and the second connector is in communication with the first section, and configured to form the waste discharge connector together with the first section.

The present disclosure further provides a gas water heater, including a water pipe, a combustion heat exchange system configured to heat water in the water pipe; and a water storage tank, the water storage tank including:

a tank body provided with an interface at one end;

an adapter fixedly connected to the tank body, the adapter being provided with a water inlet connector, a water outlet connector, and a waste discharge connector communicating with the interface, a water inlet end of the water inlet connector of the water storage tank being in communication with the water pipe; and a connection pipe installed in the tank body, one end of the connection pipe communicating with the water outlet connector, another end of the connection pipe being spaced apart from an end of the tank body away from the interface.

In an embodiment, the water storage tank further includes a guide plate sleeved on the connection pipe and adjacent to the interface, the guide plate being provided with guide holes for diversion.

In an embodiment, a density of the guide holes on the guide plate gradually increases from an inner side of the guide plate to an outer side of the guide plate.

In an embodiment, a diameter of the guide holes on the guide plate gradually increases from an inner side of the guide plate to an outer side of the guide plate.

In an embodiment, the water storage tank further includes a thermal insulation member made of thermal insulation material, the thermal insulation member being configured to cover the tank body.

In an embodiment, the water storage tank further includes a flame-retardant fastening bag, the flame-retardant fastening bag being sleeved on the thermal insulation member.

In an embodiment, the water storage tank further includes a temperature sensor, the temperature sensor being installed on the end of the tank body away from the interface; and a length of a temperature sensing probe of the temperature sensor extending into the tank body is greater than or equal to a gap between an end of the connection pipe away from the adapter and an end of the tank body away from the adapter.

In an embodiment, an installation hole is configured to penetrate through the end of the tank body away from the adapter;

the temperature sensor is installed on an outer surface of the tank body; and the temperature sensing probe of the temperature sensor is configured to extend into the tank body from the installation hole.

The present disclosure further provides a gas water heater, including:

a water pipe;

a combustion heat exchange system configured to heat water in the water pipe;

a water storage tank including:

a tank body provided with an interface at one end;

an adapter fixedly connected to the tank body, the adapter being provided with a water inlet connector, a water outlet connector, and a waste discharge connector communicating with the interface; and a connection pipe installed in the tank body, one end of the connection pipe communicating with the water outlet connector, another end of the connection pipe being spaced apart from an end of the tank body away from the interface;

a water pump, a water inlet end of the water pump being in communication with the water outlet connector of the adapter of the water storage tank, a water outlet end of the water pump being in communication with the water pipe; and a controller both electrically connected to a temperature sensor of the water storage tank and the water pump, the controller being configured to control the water pump to turn on/off according to a detection result of the temperature sensor.

In an embodiment, the water storage tank further includes a temperature sensor, the temperature sensor being installed on the end of the tank body away from the interface; and a length of a temperature sensing probe of the temperature sensor extending into the tank body is greater than or equal to a gap between an end of the connection pipe away from the adapter and an end of the tank body away from the adapter.

In an embodiment, an installation hole is configured to penetrate through the end of the tank body away from the adapter; the temperature sensor is installed on an outer surface of the tank body; and the temperature sensing probe of the temperature sensor is configured to extend into the tank body from the installation hole.

Embodiments of the present disclosure, a tank body is provided with an interface at one end; an adapter is fixedly connected to the tank body, the adapter is provided with a water inlet connector, a water outlet connector, and a waste discharge connector communicating with the interface; and a connection pipe is installed in the tank body, one end of the connection pipe is communicating with the water outlet connector, another end of the connection pipe is spaced apart from an end of the tank body away from the interface. As such, on the one hand, it is ensured that when the hot water level in the tank body reaches the height of the connection pipe away from the end of the adapter, the hot water in the tank body can be discharged, which ensures that an amount of hot water can always be stored in the tank body; on the other hand, the hot water subsequently entering the tank body will flow from the end of the tank body adjacent to the adapter to the end of the tank body away from the adapter, thus the hot water in the tank body is constantly tossed, so that the temperature of the hot water inside the tank body is almost the same, which further ensures that the temperature of the hot water discharged from the water storage tank is stable, and is beneficial to improve the performance of the gas water heater.

BRIEF DESCRIPTION OF THE DRAWINGS

In order to illustrate the embodiments of the present disclosure, drawings used in the embodiments will be briefly described below. The drawings in the following description are only some embodiments of the present disclosure.

DESCRIPTION OF REFERENCE NUMERALS

Figure 1:
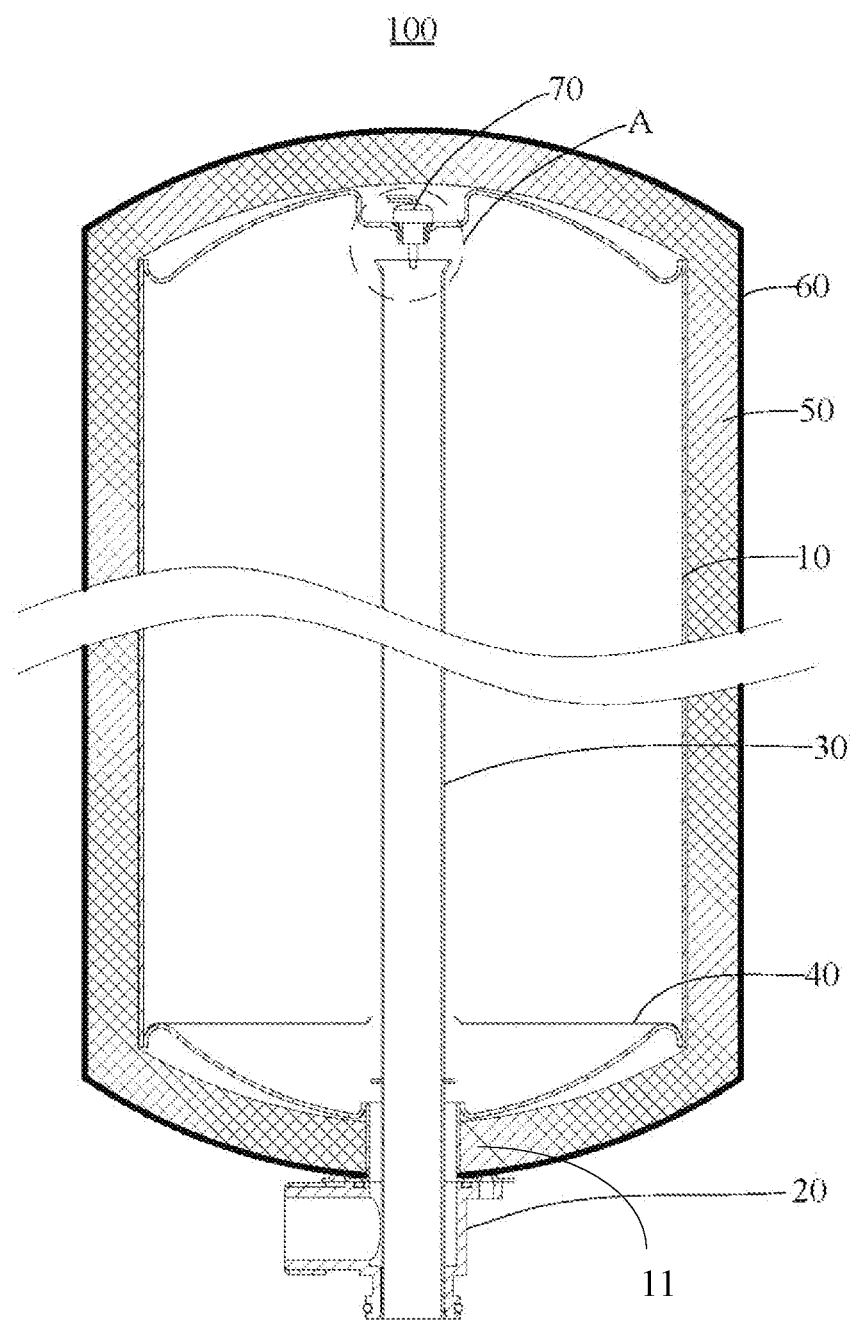
FIG. 1 is a schematic structural diagram of a water storage tank according to an embodiment of the present disclosure.

| Label | Name | Label | Name |
|---|---|---|---|
| 100 | water storage tank | 71 | temperature sensing probe |
| 10 | tank body | 12 | installation hole |
| 11 | interface | 21 | main body |
| 20 | adapter | 22 | first connector |
| 30 | connection pipe | 23 | second connector |
| 40 | guide plate | 211 | first section |
| 41 | guide hole | 212 | second section |
| 50 | thermal insulation member | 200 | gas water heater |
| 51 | cover | 210 | water pipe |
| 511 | avoiding hole | 220 | combustion heat exchange system |
| 60 | flame-retardant fastening bag | 230 | water pump |
| 70 | temperature sensor | | |

DETAILED DESCRIPTION OF THE DISCLOSURE

The embodiments of the present disclosure will be described in more detail below with reference to the accompanying drawings.

It should be noted that if there is a directional indicator (such as up, down, left, right, front, back, etc.) in the embodiments of the present disclosure, the directional indication is only used to explain the relative positional relationship, movement, etc. of the various components in a specific posture (as shown in the drawings), if the specific posture changes, the directional indicator will change accordingly.

Besides, the descriptions associated with, e.g., "first" and "second," in the present disclosure are merely for descriptive purposes, and cannot be understood as indicating or suggesting relative importance or impliedly indicating the number of the indicated embodiment. Therefore, the feature associated with "first" or "second" can expressly or impliedly include at least one such feature.

The present disclosure provides a water storage tank, which should be installed in a gas water heater. The water storage tank is configured to store hot water while also being configured to mix the hot water and the temperature of the hot water discharged from the water storage tank is stable.

In some embodiments of the present disclosure, as shown in FIG. 1, a water storage tank 100 including:

a tank body 10 provided with an interface 11 at one end;

an adapter 20 fixedly connected to the tank body 10, the adapter 20 being provided with a water inlet connector, a water outlet connector, and a waste discharge connector communicating with the interface 11; and a connection pipe 30 installed in the tank body 10, one end of the connection pipe 30 communicating with the water outlet connector, another end of the connection pipe 30 being spaced apart from an end of the tank body 10 away from the interface 11.

In one embodiment, there are many shapes of the tank body 10, which can be cylindrical, cuboid, polygonal, etc. The shape of the tank body 10 is not specifically limited here. There are many ways to shape the tank body 10, which can be formed by welding sheet metal parts, or formed by casting, etc. The shape of the tank body 10 is not specifically limited here. The position of the interface 11 on the tank body 10 is relatively flexible, which can be arranged at the end of the tank body 10 or at a position adjacent to the end of the tank body 10 on the side. The location of the interface 11 is not specifically limited here.

There are many ways to connect the adapter 20 to the tank body 10. The adapter 20 may be connected to the tank body 10 by welding, screw connection, plug-in connection and other connection methods, which will not be listed here. In one embodiment, the adapter 20 may be connected to the tank body 10 by screw connection, that is, the tank body 10 is provided with screw holes located on the periphery of the interface 11. The adapter 20 is provided with screw holes therethrough. The screw passes through the screw hole on the adapter 20 and is connected by a thread with the screw hole at the corresponding position on the tank body 10, so that the adapter 20 can be fixedly connected to the tank body 10.

Considering the tightness between the adapter 20 and the tank body 10, a sealing ring (not shown) is also provided between the tank body 10 and the adapter 20. In addition, the surface of the adapter 20 that abuts the tank body 10 is recessed with a mounting groove (not shown) for the sealing ring to be installed, which facilitates the positioning and installation of the sealing ring.

A water outlet end of the water inlet connector, a water inlet end of the water outlet connector and a water inlet end of the waste discharge connector on the adapter 20 are all arranged at one end of the adapter 20. The three can be coaxial or have different axes. When the water outlet end of the water inlet connector, the water inlet end of the water outlet connector, and the water inlet end of the waste discharge connector are coaxial, the three are arranged at intervals between the inside and the outside. When the water outlet end of the water inlet connector, the water inlet end of the water outlet connector, and the water inlet end of the waste discharge connector have different axes, the three may be arranged in a straight, triangular or other shape. Since the water inlet connector, the water outlet connector, and the waste discharge connector are integrated on the adapter 20, this allows only one interface 11 to be provided on the tank body 10, thereby the number of interfaces 11 provided on the tank body 10 is greatly reduced, thereby reducing the risk of water leakage in the water storage tank 100.

The connection tube 30 may be a straight tube, a spiral tube, a curved tube, etc., as long as two ends of the connection pipe 30 are arranged at intervals along the extending direction of the tank body 10. There are many ways to connect the connection pipe 30 to the water outlet connector on the adapter 20, such as threaded connection, plug-in connection, welding, etc. The connection mode of the connection pipe 30 and the water outlet connector is not specifically limited here.

It should be noted that, when the water storage tank 100 is installed in the gas water heater 200, the tank body 10 of the water storage tank 100 is placed upside down in the housing of the gas water heater 200 in a vertical direction, that is, the interface 11 of the tank body 10 is downward. When injecting hot water into the tank body 10, since the water outlet end of the water inlet connector on the adapter 20 is directly in communication with the tank body 10, the water outlet connector on the adapter 20 is in communication with the connection pipe 30. There is a distance between the end of the connection pipe 30 away from the adapter 20 and the adapter 20, which makes it necessary to inject an amount of hot water into the tank body 10 before the hot water in the tank body 10 can be discharged through the connection pipe 30, thus an amount of hot water can always be stored in the tank body 10. The hot water stored in the tank body 10 can also play a role in adjusting the water temperature, which makes the adjustment ratio of the combustion heat exchange system 220 of the gas water heater 200 provided with the water storage tank 100, that is, the ratio of the minimum load to the rated load of the combustion heat exchange system 220 can reach 1:20, which enables the gas water heater 200 provided with the water storage tank 100 to adjust the temperature of the hot water more finely, thereby helping to improve the performance of the gas water heater 200.

Meanwhile, since the hot water entering the tank body 10 from the water inlet connector of the adapter 20 can only be discharged after flowing to the end of the connection pipe 30 away from the adapter 20, which will make the hot water in the tank body 10 continue to churn when the hot water entering the tank body 10 flows from bottom to top. In this way, the hot water in the tank body 10 can be fully mixed. As a result, the temperature of the water in the tank body 10 is almost the same everywhere, thereby ensuring that the temperature of the hot water discharged from the tank body 10 is stable, which is beneficial to improve the performance of the gas water heater 200.

Besides, since the water storage tank 100 also has a heat preservation effect, which makes that during a period of time when the gas water heater 200 just start working, when hot water with a lower water temperature enters the tank body 10, it can be mixed with the hot water with a higher temperature in the water storage tank 100 before being discharged for use by the user, which ensures that the temperature of the hot water discharged from the gas water heater 200 during a period of time when the gas water heater 200 just start working will not be too low.

In addition, when the gas water heater 200 stops working, the hot water in the water pipe 210 of the gas water heater 200 will continue to flow into the tank body 10 under the action of inertia, and the water level inside the tank body 10 exceeds the end of the connection pipe 30 away from the adapter 20. However, the end of the connection pipe 30 away from the adapter 20 and the end of the tank body 10 away from the adapter 20 are spaced apart, which makes the tank body 10 always contain an amount of air. The air has the characteristics of being compressible, which can alleviate the water hammer effect in the tank body 10, thereby helping to ensure the working life of the tank body 10.

It should also be noted that the impurities mixed in the hot water of the tank body 10 will be deposited at the bottom of the tank body 10 under the action of gravity, that is, at the end of the tank body 10 adjacent to the adapter 20. When cleaning the tank body 10, clean water enters the tank body 10 from the water inlet connector of the adapter 20 and is discharged from the waste discharge connector of the adapter 20. On the one hand, this ensures that when clean water enters the tank body 10, the impurities deposited on the end of the tank body 10 adjacent to the adapter 20 can be washed, so that the impurities are discharged from the waste discharge connector of the adapter 20. On the other hand, when cleaning the tank body 10, only one end of the tank body 10 adjacent to the adapter 20 needs to be cleaned, which greatly reduces the amount of clean water.

It is worth noting that the hot water entering the inside of the tank body 10 from the water inlet of the adapter 20 will flow in the middle of the tank body 10. Only a small amount of hot water that enters the tank body 10 flows along the inner wall of the tank body 10, which will cause the hot water that later enters the tank body 10 and the hot water that originally enters the tank body 10 to mix unevenly, thereby will cause relatively small fluctuations in the temperature of the hot water everywhere in the tank body 10, which in turn will cause the temperature of the hot water discharged from the water storage tank 100 to fluctuate. In view of this, the water storage tank 100 further includes a guide plate 40 sleeved on the connection pipe 30 and adjacent to the interface 11, the guide plate 40 being provided with guide holes 41.

It should be noted that the area of the guide plate 40 is equivalent to the cross-sectional area of the tank body 10, that is, the edge of the guide plate 40 is adjacent to the inner wall surface of the tank body 10 or abuts against the inner wall surface of the tank body 10, which causes the hot water on the side of the guide plate 40 adjacent to the interface 11 to form multiple streams of hot water under the diversion action of the guide plate 40. The multiple streams of hot water flow into the side of the guide plate 40 away from the interface 11. Guide holes 41 on the guide plate 40 are distributed from the inner side of the guide plate 40 to the outer side of the guide plate 40, thus the hot water after passing through the guide plate 40 can be evenly mixed with the hot water on the side of the guide plate 40 away from the interface 11, which ensures that the water temperature on the side of the guide plate 40 away from the interface 11 is equivalent, thereby ensuring that the temperature of the hot water discharged from the water storage tank 100 is stable.

Figure 2:
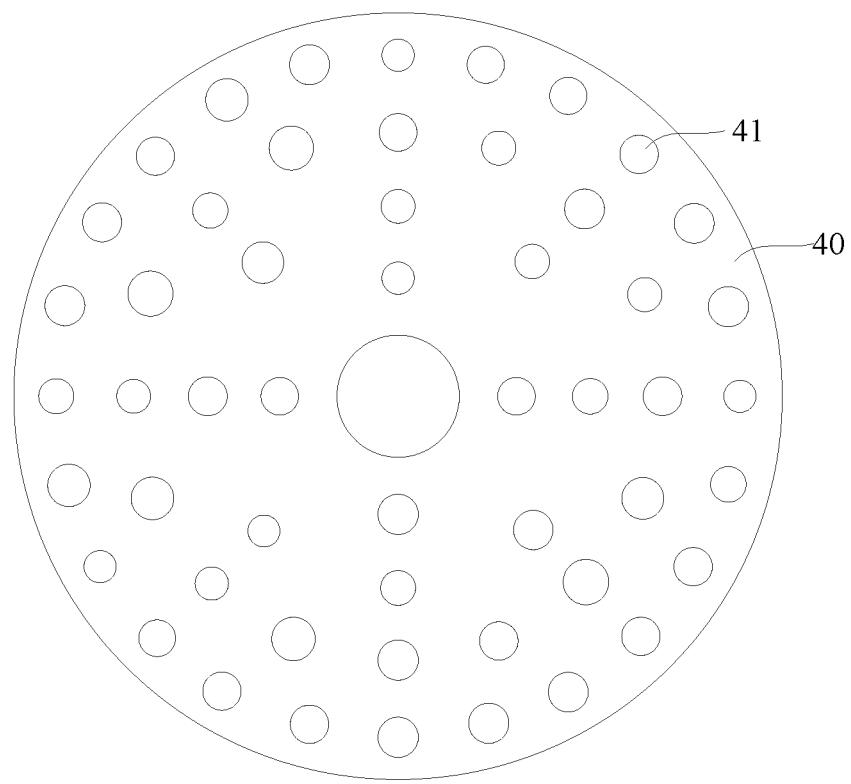
FIG. 2 is a schematic structural diagram of a guide plate in FIG. 1 according to an embodiment of the present disclosure.

According to the characteristics of water flowing in the pipeline, the water volume in the middle of the pipeline is large and the water flow velocity is high, and the water volume and the water flow velocity near the inner wall of the pipe are small. In view of this, as shown in FIG. 2, a density of the guide holes 41 on the guide plate 40 gradually increases from an inner side of the guide plate 40 to an outer side of the guide plate 40. Thus, the water passing area inside the guide plate 40 is smaller than the water passing area outside the guide plate 40, but the flow velocity of hot water passing through the guide holes 41 outside the guide plate 40 is lower than the flow velocity of the hot water passing through the guide holes 41 inside the guide plate 40. According to the fluid flow calculation formula Q=AV (Q is the flow value, A is the water passing area, V is the water flow velocity), it can be known that in a unit time, the amount of hot water passing through the guide plate 40 is approximately the same. In this way, the amount of hot water replenished on the side of the guide plate 40 away from the interface 11 is approximately equal, so that the temperature of the hot water inside the tank body 10 is approximately the same.

Figure 3:
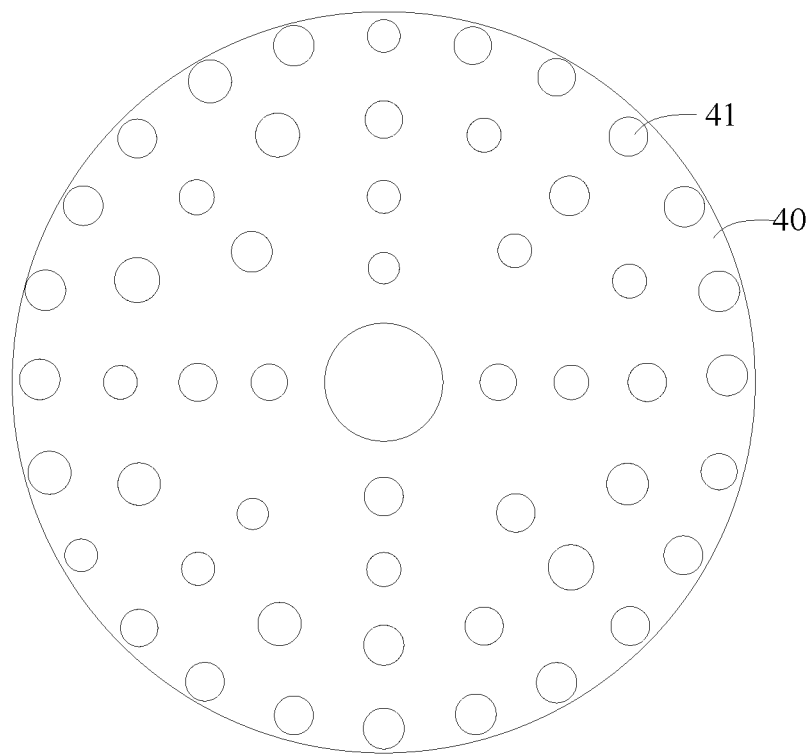
FIG. 3 is a schematic structural diagram of a guide plate in FIG. 1 according to another embodiment of the present disclosure.

In one embodiment, in order to uniformly mix the hot water entering the tank body 10 later with the hot water entering the tank body 10 first, as shown in FIG. 3, a diameter of the guide holes 41 on the guide plate 40 gradually increases from an inner side of the guide plate 40 to an outer side of the guide plate 40. It should be noted that the larger the diameter of the guide hole 41, the larger the water passing area. The diameter of the guide hole 41 on the guide plate 40 gradually increases from the inner side of the guide plate 40 to the outer side of the guide plate 40, which makes the water passing area inside the guide plate 40 smaller than the water passing area outside the guide plate 40, but the flow rate of hot water passing through the guide holes 41 inside the guide plate 40 greater than the flow rate of hot water passing through the guide holes 41 outside the guide plate 40. According to the fluid flow calculation formula Q=AV (Q is the flow value, A is the water passing area, V is the water flow velocity), it can be known that the amount of hot water passing through the inside of the guide plate 40 in a unit time is equivalent to the amount of hot water passing through the outside of the guide plate 40. In this way, the amount of hot water replenished on the side of the guide plate 40 away from the interface 11 is approximately equal, so that the temperature of the hot water inside the tank body 10 is approximately the same.

Figure 4:
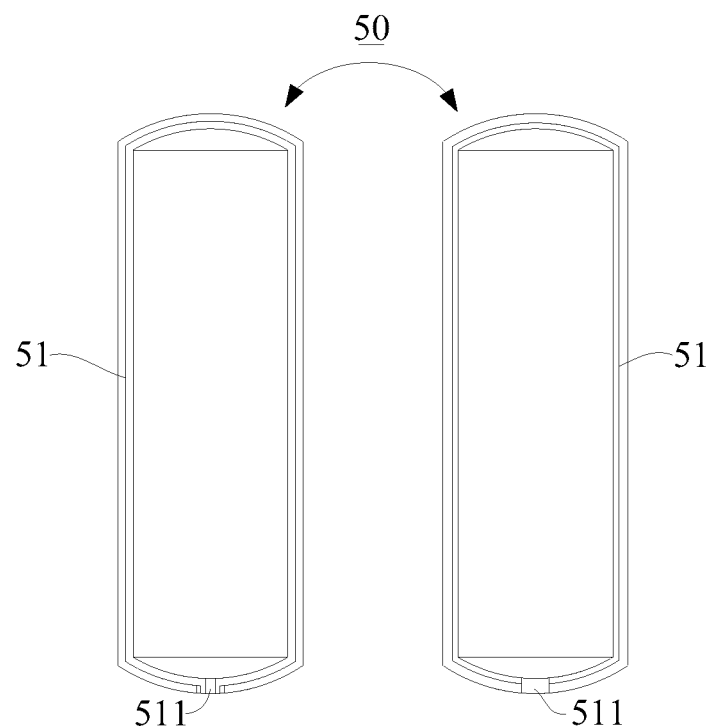
FIG. 4 is a schematic structural diagram of a thermal insulation member in FIG. 1.

In order to make the heat preservation effect of the water storage tank 100 better, in an embodiment of the present disclosure, as shown in FIG. 4, the water storage tank 100 also includes a thermal insulation member 50 made of thermal insulation material. The thermal insulation material can be foam, glass wool, etc. The thermal insulation member 50 covers the tank body 10 to slow down the heat loss of hot water in the tank body 10, thus the temperature of the hot water in the tank body 10 can be maintained for a long time. Therefore, during a period of time when the gas water heater 200 is turned on, after the lower temperature hot water enters the tank body 10, it can be mixed with the higher temperature hot water in the tank body 10 before being discharged, which avoids the problem that the temperature of the hot water discharged from the gas water heater 200 is too low during a period of time when the gas water heater 200 is turned on.

Besides, the thermal insulation member 50 can also play a buffering function, which can buffer the water storage tank 100 when the water storage tank 100 is being moved or transported, which effectively prevents the water storage tank 100 from being in rigid contact with other components of the gas water heater 200 due to turbulence, thereby causing the water storage tank 100 or other components of the gas water heater 200 to be damaged.

Further, the thermal insulation member 50 includes two covers 51, both of the two covers 51 are provided with a containing groove. When the two covers 51 are assembled with the tank body 10, the two covers 51 are respectively buckled with one side of the tank body 10, and the two covers 51 are fixedly connected. In this way, the tank body 10 is completely located in the heat preservation cavity surrounded by the two covers 51, which facilitates the assembly and disassembly of the thermal insulation member 50 and the tank body 10.

It should be noted that the two covers 51 are correspondingly provided with avoiding holes 511 through which the interface 11 on the tank body 10 extends.

Considering that the thermal insulation material is ignited, in an embodiment of the present disclosure, as shown in FIG. 1, the water storage tank 100 is also provided with a flame-retardant fastening bag 60, and the flame-retardant fastening bag 60 is configured to cover the thermal insulation member 50.

It should be noted that the flame-retardant fastening bag 60 can be made of carpet back glue flame retardant, silicone rubber flame retardant, etc. The flame-retardant fastening bag 60 can not only prevent the thermal insulation member 50 from being ignited, but also can limit the thermal insulation member 50, therefore the thermal insulation member 50 can better wrap the water storage tank 100.

In order to conveniently detect the water temperature of the hot water discharged from the tank body 10, the water storage tank 100 further includes a temperature sensor 70. The temperature sensor 70 may be a thermocouple, a thermistor, a resistance temperature detector (RTD), etc. The temperature sensor 70 is not limited here. The temperature sensor 70 is installed on the end of the tank body 10 away from the interface 11. A length of a temperature sensing probe 71 of the temperature sensor 70 extending into the tank body 10 is greater than or equal to a gap between an end of the connection pipe 30 away from the adapter 20 and an end of the tank body 10 away from the adapter 20. In one embodiment, the vertical distance between the temperature sensing probe 71 of the temperature sensor 70 and the end of the connection pipe 30 away from the adapter 20 is 4 mm.

It should be noted that the hot water subsequently entering the tank body 10 flows from the end of the tank body 10 adjacent to the adapter 20 to the end of the tank body 10 away from the adapter 20. If the temperature of the hot water at the end of the tank body 10 away from the adapter 20 meets the user's needs, it means that the hot water in the tank body 10 meets the user's needs.

That is to say, when the water temperature detected by the temperature sensor 70 is greater than or equal to the preset water temperature, it means that the hot water in the tank body 10 meets the user's needs. When the water temperature detected by the temperature sensor 70 is lower than the preset water temperature, it means that the hot water in the tank body 10 cannot meet the user's needs. The temperature sensor 70 can display the detection result to the user, and the temperature sensor 70 can also be electrically connected to the controller of the gas water heater 200, and send the detection result to the controller of the gas water heater 200. The controller of the gas water heater 200 can control the heat exchange efficiency of the combustion heat exchange system 220 of the gas water heater 200 according to the detection result of the temperature sensor 70, that is, control the firepower of the combustion heat exchange system 220, to adjust the temperature of the hot water that will subsequently enter the tank body 10 to ensure that the temperature of the hot water discharged from the tank body 10 meets the user's needs.

It is worth noting that the temperature sensing probe 71 of the temperature sensor 70 can be installed on the outside of the connection pipe 30, or can extend into the connection pipe 30. In one embodiment, the temperature sensing probe 71 of the temperature sensor 70 extends from the end of the connection tube 30 away from the adapter 20 into the connection tube 30. With this arrangement, the temperature sensor 70 can detect the temperature of the hot water discharged from the tank body 10 more accurately.

Figure 5:
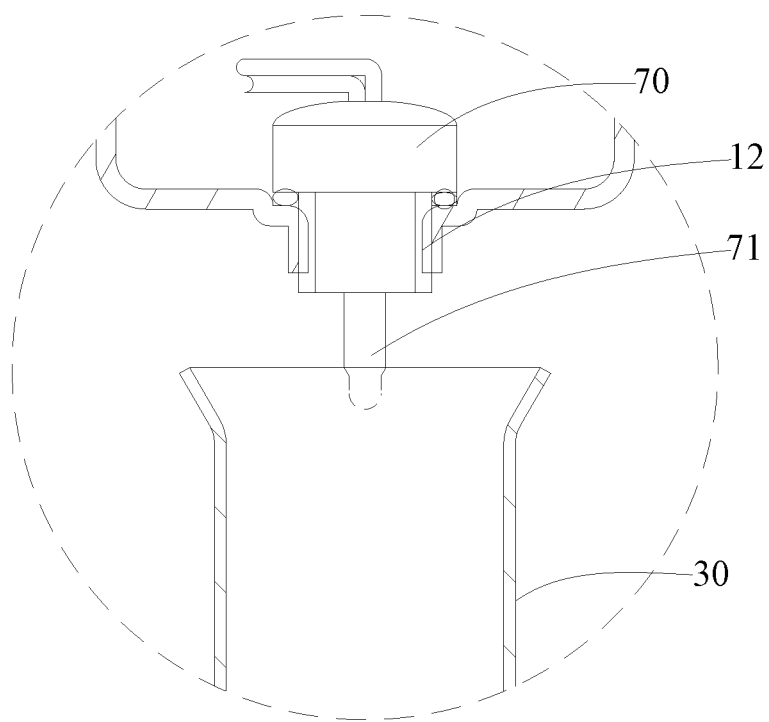
FIG. 5 is a partial enlarged view of portion A in FIG. 1.

In order to facilitate the installation of the temperature sensor 70, as shown in FIG. 5, the end of the tank body 10 away from the adapter 20 is penetrated with an installation hole 12; the temperature sensor 70 is installed on an outer surface of the tank body 10; and the temperature sensing probe 71 of the temperature sensor 70 is configured to extend into the tank body 10 from the installation hole 12.

It should be noted that the circuit board of the temperature sensor 70 cannot touch water. The circuit board of the temperature sensor 70 is arranged outside the tank body 10, and the temperature sensing probe 71 of the temperature sensor 70 is extended into the tank body 10. On the one hand, it is convenient to arrange the wires that are electrically connected to the circuit board of the temperature sensor 70, and on the other hand, the circuit board of the temperature sensor 70 is effectively prevented from being affected by the hot water in the tank body 10.

Figure 6:
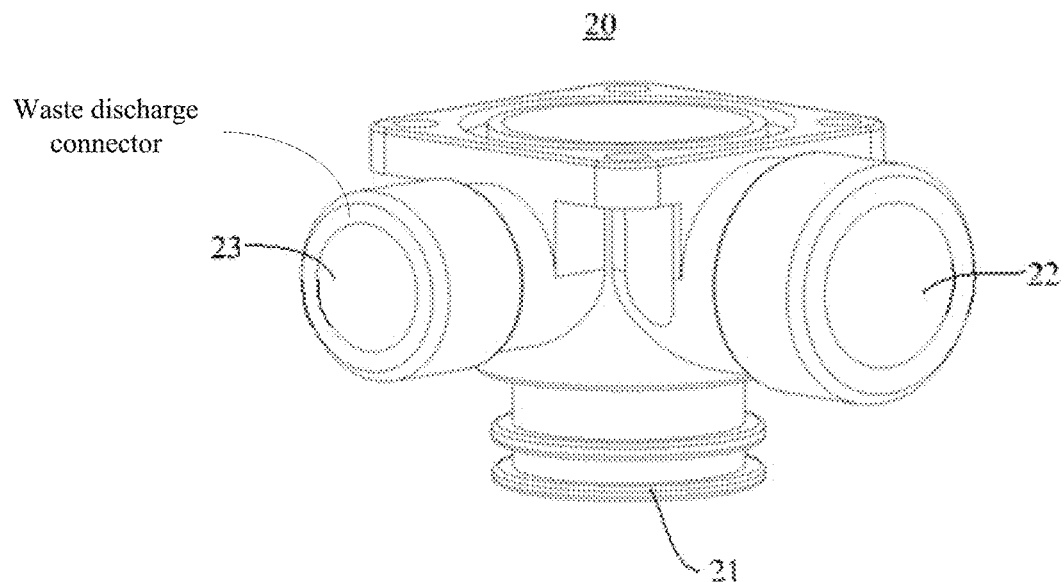
FIG. 6 is a schematic structural diagram of an adapter in FIG. 1.
Figure 7:
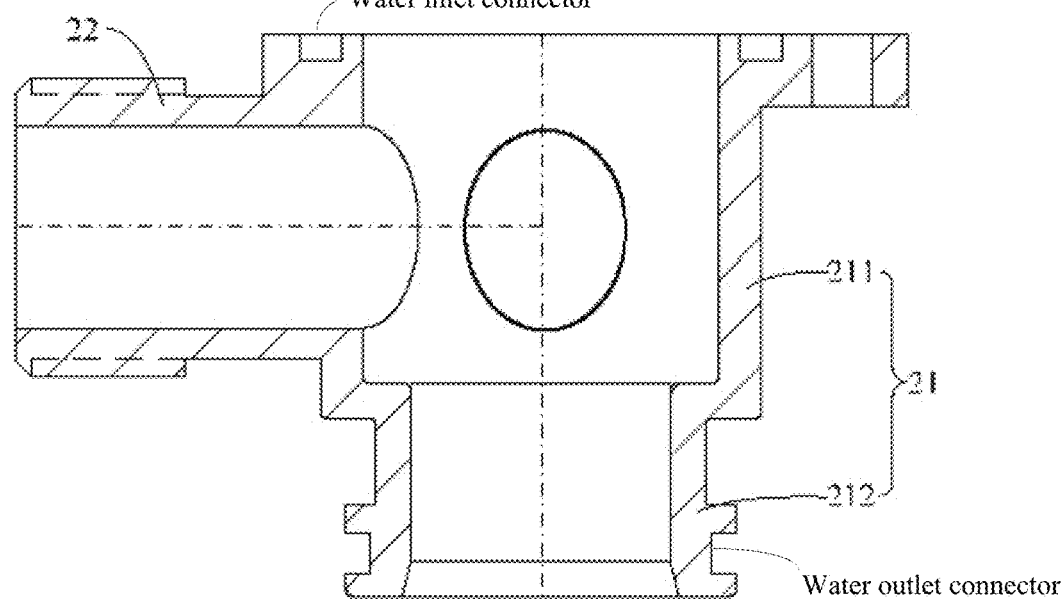
FIG. 7 is a cross-sectional view of the adapter in FIG. 1.

In order to simplify the structure of the adapter 20, in an embodiment of the present disclosure, please refer to FIGS. 6 and 7, the adapter 20 includes a main body 21, a first connector 22, and a second connector 23 in a cylindrical shape. The main body 21 includes a first section 211 with a larger inner diameter and communicating with the interface 11 of the tank body 10, and a second section 212 with a smaller inner diameter and communicating with the first section 211, the second section 212 is configured to form the water outlet connector. The first connector 22 is in communication with the first section 211, and configured to form the water inlet connector together with the first section 211; and the second connector 23 is in communication with the first section 211, and configured to form the waste discharge connector together with the first section 211. The cooperation between the connection pipe 30 and the first section 211 of the main body 21 is used to block the first section 211 and the second section 212 of the main body 21, which simplifies the connectors of the adapter 20, thereby facilitating the production of the adapter 20.

Figure 8:
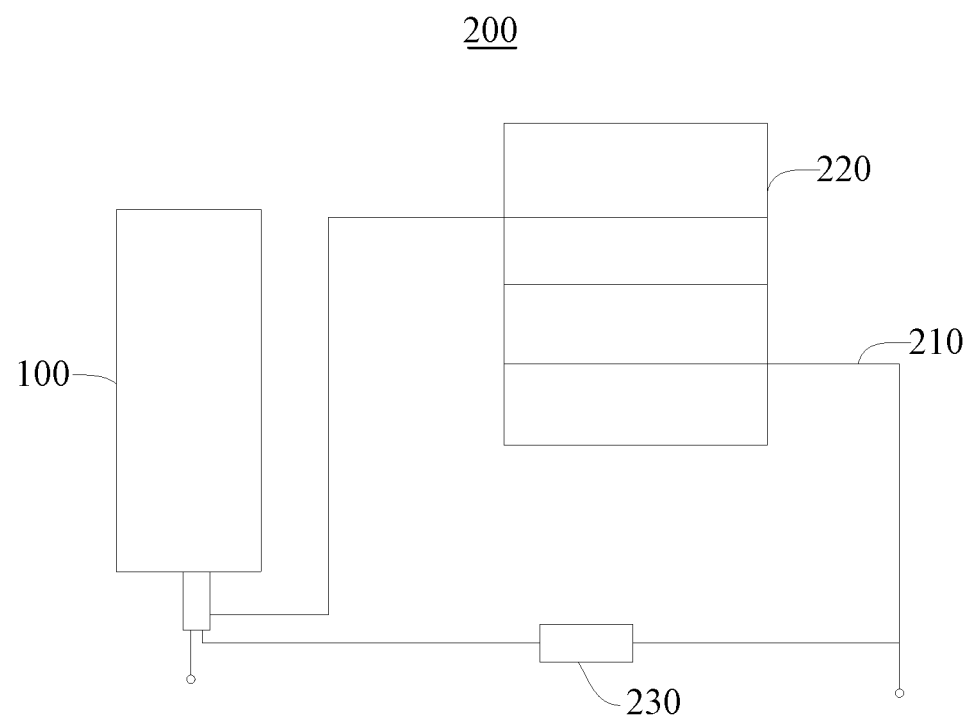
FIG. 8 is a schematic structural diagram of a gas water heater according to an embodiment of the present disclosure.

The present disclosure further provides a gas water heater 200. As shown in FIG. 8, the gas water heater 200 includes a water pipe 210, a combustion heat exchange system 220, and a water storage tank 100. The specific structure of the water storage tank 100 refers to the above-mentioned embodiments. Since the gas water heater 200 adopts embodiments of the present disclosure.

The water inlet connector of the adapter 20 of the water storage tank 100 is in communication with the water pipe 210. The water outlet connector of the adapter 20 of the water storage tank 100 is in communication with the shower head of the gas water heater 200. The waste discharge connector of the adapter 20 of the water storage tank 100 is in communication with the waste discharge pipe of the gas water heater 200. The gas water heater 200 also includes a water pump 230 and a controller. The water inlet end of the water pump 230 is in communication with the water outlet connector of the adapter 20. The water outlet end of the water pump 230 is in communication with the water pipe 210. The controller is respectively electrically connected with the temperature sensor 70 of the water storage tank 100, the combustion heat exchange system 220 and the water pump 230. The controller controls the operation of the water pump 230 and the combustion heat exchange system 220 according to the detection result of the temperature sensor 70.

In one embodiment, when the temperature sensor 70 detects that the water temperature in the tank body 10 is lower than the preset water temperature, the controller controls the operation of the water pump 230 to pump the water in the tank body 10 into the water pipe 210, and the controller also controls the operation of the combustion heat exchange system 220 to heat the water pipe 210, and the temperature of the hot water in the tank body 10 can be kept stable. When the temperature sensor 70 detects that the water temperature in the tank body 10 is too high, the controller controls the operation of the water pump 230 to pump the water in the tank body 10 into the water pipe 210, and the controller also controls the combustion heat exchange system 220 to close or reduce the heat exchange efficiency, and after the hot water entering the water pipe 210 from the tank body 10 is mixed with the cold water in the water pipe 210 and passed through the combustion heat exchange system 220, the obtained hot water temperature can meet the user's needs, which can also ensure that the temperature of the hot water in the tank body 10 can be kept stable, and the gas water heater 200 can supply hot water of different temperatures, thereby improving the performance of the gas water heater 200.

What is claimed is:

1. A water storage tank, comprising:
a tank body provided with an interface at a first end;
an adapter fixedly connected to the tank body, the adapter being provided with a water inlet connector, a water outlet connector, and a waste discharge connector communicating with the interface; and
a connection pipe installed in the tank body, a first end of the connection pipe communicating with the water outlet connector, a second end of the connection pipe being spaced apart from the first end of the tank body and away from the interface;
wherein the water storage tank further includes a temperature sensor, the temperature sensor being installed on a second end of the tank body away from the interface;
wherein a length of a temperature sensing probe of the temperature sensor extending into the tank body is greater than or equal to a gap between the second end of the connection pipe and the second end of the tank body.

2. The water storage tank of claim 1, wherein the water storage tank further includes a guide plate sleeved on the connection pipe and adjacent to the interface, the guide plate being provided with a plurality of guide holes.

3. The water storage tank of claim 2, wherein a density of the guide holes on the guide plate gradually increases from an inner side of the guide plate to an outer side of the guide plate.

4. The water storage tank of claim 2, wherein a diameter of the guide holes on the guide plate gradually increases from an inner side of the guide plate to an outer side of the guide plate.

5. The water storage tank of claim 1, wherein the water storage tank further includes a thermal insulation member made of thermal insulation material, the thermal insulation member being configured to cover the tank body.

6. The water storage tank of claim 5, wherein the water storage tank further includes a flame-retardant fastening bag, the flame-retardant fastening bag being sleeved on the thermal insulation member.

7. The water storage tank of claim 1, wherein:
the first end of the tank body away from the adapter is penetrated with an installation hole;
the temperature sensor is installed on an outer surface of the tank body; and
the temperature sensing probe of the temperature sensor is configured to extend into the tank body from the installation hole.

8. The water storage tank of claim 1, wherein:
the adapter includes a main body, a first connector, and a second connector in a cylindrical shape;
the main body includes a first section with a larger inner diameter and communicating with the interface of the tank body, and a second section with a smaller inner diameter and communicating with the first section, the second section being configured to form the water outlet connector;
the first connector is in communication with the first section, and configured to form the water inlet connector; and
the second connector is in communication with the first section, and configured to form the waste discharge connector.

9. A gas water heater, comprising:
a water pipe;
a combustion heat exchange system configured to heat water in the water pipe; and
a water storage tank including:
a tank body provided with an interface at a first end;
an adapter fixedly connected to the tank body, the adapter being provided with a water inlet connector, a water outlet connector, and a waste discharge connector communicating with the interface, a water inlet end of the water inlet connector of the water storage tank being in communication with the water pipe; and
a connection pipe installed in the tank body, a first end of the connection pipe communicating with the water outlet connector, a second end of the connection pipe being spaced apart from the first end of the tank body and away from the interface;
wherein the water storage tank further includes a temperature sensor, the temperature sensor being installed on a second end of the tank body away from the interface;
wherein a length of a temperature sensing probe of the temperature sensor extending into the tank body is greater than or equal to a gap between the second end of the connection pipe and the second end of the tank body.

10. The gas water heater of claim 9, wherein the water storage tank further includes a guide plate sleeved on the connection pipe and adjacent to the interface, the guide plate being provided with a plurality of guide holes for diversion.

11. The gas water heater of claim 10, wherein a density of the guide holes on the guide plate gradually increases from an inner side of the guide plate to an outer side of the guide plate.

12. The gas water heater of claim 10, wherein a diameter of the guide holes on the guide plate gradually increases from an inner side of the guide plate to an outer side of the guide plate.

13. The gas water heater of claim 9, wherein the water storage tank further includes a thermal insulation member made of thermal insulation material, the thermal insulation member being configured to cover the tank body.

14. The gas water heater of claim 13, wherein the water storage tank further includes a flame-retardant fastening bag, the flame-retardant fastening bag being sleeved on the thermal insulation member.

15. The gas water heater of claim 9, wherein:
an installation hole is configured to penetrate through the first end of the tank body away from the adapter;
the temperature sensor is installed on an outer surface of the tank body; and
the temperature sensing probe of the temperature sensor is configured to extend into the tank body from the installation hole.

16. A gas water heater, comprising:
a water pipe;
a combustion heat exchange system configured to heat water in the water pipe;
a water storage tank including:
a tank body provided with an interface at a first end;
an adapter fixedly connected to the tank body, the adapter being provided with a water inlet connector, a water outlet connector, and a waste discharge connector communicating with the interface; and
a connection pipe installed in the tank body, a first end of the connection pipe communicating with the water outlet connector, a second end of the connection pipe being spaced apart from the first end of the tank body and away from the interface;
a water pump, a water inlet end of the water pump being in communication with the water outlet connector of the adapter of the water storage tank, a water outlet end of the water pump being in communication with the water pipe; and
a controller both electrically connected to a temperature sensor of the water storage tank and the water pump, the controller being configured to control the water pump to turn on/off according to a detection result of the temperature sensor;
wherein the water storage tank further includes a temperature sensor, the temperature sensor being installed on a second end of the tank body away from the interface;
wherein a length of a temperature sensing probe of the temperature sensor extending into the tank body is greater than or equal to a gap between the second end of the connection pipe and the second end of the tank body.

17. The gas water heater of claim 16, wherein:
an installation hole is configured to penetrate through the first end of the tank body away from the adapter;
the temperature sensor is installed on an outer surface of the tank body; and
the temperature sensing probe of the temperature sensor is configured to extend into the tank body from the installation hole.

* * * * *